United States Patent
Verma (10) Patent No.: US 8,145,589 B2
(45) Date of Patent: Mar. 27, 2012

(54) METHOD AND SYSTEM FOR APPLICATION SUPPORT KNOWLEDGE TRANSFER BETWEEN INFORMATION TECHNOLOGY ORGANIZATIONS

(75) Inventor: Roopak Verma, Chennai (IN)

(73) Assignee: Ford Motor Company, Dearborn, MI (US)

( * ) Notice: Subject to any disclaimer, the term of this patent is extended or adjusted under 35 U.S.C. 154(b) by 554 days.

(21) Appl. No.: 12/468,269

(22) Filed: May 19, 2009

(65) Prior Publication Data

US 2009/0299944 A1    Dec. 3, 2009

Related U.S. Application Data

(60) Provisional application No. 61/057,345, filed on May 30, 2008.

(51) Int. Cl.
*G06F 17/30* (2006.01)
*G06N 5/00* (2006.01)

(52) U.S. Cl. ............................................. 706/50; 707/10
(58) Field of Classification Search ...................... 706/50
See application file for complete search history.

(56) References Cited

U.S. PATENT DOCUMENTS 7,299,145 B2 * 11/2007 De Jonge et al. ............. 702/104
7,321,886 B2 *  1/2008 Swaminathan et al. ........ 706/60
7,809,671 B2 * 10/2010 Swaminathan et al. ........ 706/60
8,069,134 B2 * 11/2011 Swaminathan et al. ........ 706/60

OTHER PUBLICATIONS

Development of a framework for sub-topic discovery from the Web, Uluhan, E.; Badur, B.; Management of Engineering & Technology, 2008. PICMET 2008. Portland International Conference on Digital Object Identifier: 10.1109/PICMET.2008.4599696 Publication Year: 2008 , pp. 878-888.*
Using Outlier Detection to Reduce False Positives in Intrusion Detection, Fu Xiao; Xie Li; Network and Parallel Computing, 2008. NPC 2008. IFIP International Conference on Digital Object Identifier: 10.1109/NPC.2008.26 Publication Year: 2008 , pp. 26-33.*
Towards incorporating language morphology into statistical machine translation systems, Karageorgakis, P.; Potamianos, A.; Klasinas, I.; Automatic Speech Recognition and Understanding, 2005 IEEE Workshop on Digital Object Identifier: 10.1109/ASRU.2005.1566533 Publication Year: 2005 , pp. 80-85.*
A statistical approach for phrase location and recognition within a text line: an application to street name recognition, El-Yacoubi, M.A.; Gilloux, M.; Bertille, J.-M.; Pattern Analysis and Machine Intelligence, IEEE Transactions on vol. 24 , Issue: 2 Digital Object Identifier: 10.1109/34.982898 Publication Year: 2002 , pp. 172-188.*

* cited by examiner

*Primary Examiner* — Michael B Holmes
(74) *Attorney, Agent, or Firm* — Raymond L. Coppiellie; Brooks Kushman P.C.

(57) ABSTRACT

A computer network system for implementing a knowledge transfer process includes one or more local computers. The processors of the computers may access a knowledge database stored in local computer memory. The system also includes remote computers. The processors of the remote computers may access the knowledge database stored in local computer memory. The processors in at least one local and/or remote computer may automatically score individual and/or team performance, and may detect triggering events establishing that a predetermined milestone has been met. The processors in at least one local and/or remote computer may also determine that a knowledge transfer process should continue to a next phase, based at least on scoring of performances and completion of one or more predetermined milestones. The processors in at least one local and/or remote computer may automatically notify one or more process participants that the process should continue to the next phase.

20 Claims, 7 Drawing Sheets

| Stage | Knowledge Creation | Knowledge Organization | Knowledge Maintenace | Knowledge Access |
|---|---|---|---|---|
| Knowledge Acquisition | X | X | X | |
| Shadowing & Joint Operations | | | X | X |
| Onsite Support & Offsite Transfer | | | X | X |
| Offsite Stabilization | | | X | X |
| Steady State | | | X | X |

METHOD AND SYSTEM FOR APPLICATION SUPPORT KNOWLEDGE TRANSFER BETWEEN INFORMATION TECHNOLOGY ORGANIZATIONS

CROSS-REFERENCE TO RELATED APPLICATIONS

This application claims the benefit of U.S. provisional application Ser. No. 61/057,345 filed on May 30, 2008, which is hereby incorporated by reference in its entirety.

BACKGROUND

1. Technical Field

Embodiments of the present invention relate generally to knowledge transfer systems and processes, and more particularly to a system and process for transferring application knowledge between information technology organizations according to a knowledge management framework.

2. Background Art

U.S. Pat. No. 7,321,886 entitled "Rapid Knowledge Transfer Among Workers" issued Jan. 22, 2008 to Kishore Swaminathan et al. This patent discloses a system and method enabling rapid knowledge transfer, for example between a plurality of experts and a plurality of apprentices located remotely from the experts. The system makes use of unique tools to facilitate transfer of knowledge and collaboration between individuals, even among remotely located individuals. An input to the system is a Knowledge Transfer Plan which has been designed to orchestrate the knowledge transfer. The knowledge transfer system integrates a shared repository and collaboration tools for use by the expert and apprentice. The collaboration tools may be accessed through role-specific portals which are automatically created from the Knowledge Transfer Plan. In one embodiment, the system is configured with a worldwide web-based interface and an integrated suite of tools to support knowledge transfer activities on a global basis to facilitate knowledge transfer among workers engaged in an outsourcing business process.

U.S. Patent Application Publication No. 2007-0174066 entitled "Device and Method for Time and Knowledge Exchange and Management" issued Jul. 26, 2007 to Shi-Kuo Chang discloses a knowledge management system which includes a profile manager for managing user profiles and a bid manager for receiving a project listing and a set of project parameters associated with the listing. The bid manager provides a bidding room according to at least one of the project parameters. The project parameters include an identification of at least one expertise area associated with the project.

U.S. Provisional Patent Application Ser. No. 60/421,274 entitled "Owner-Brokered Knowledge Sharing Machine" to Richard Park Anderson discloses a method for enhancing the sharing of knowledge within an organization. The method encourages knowledge sharing by creating a system which allows knowledge creators to broker information with knowledge seekers and features that reward knowledge owners and knowledge seekers for sharing information. The system aligns organizational incentives for promoting the sharing and reuse of knowledge with the desire of individuals, based on human nature to manage their digitized personal knowledge closely and to share it within the context of a trust-based relationship.

DETAILED DESCRIPTION OF THE PREFERRED EMBODIMENT(S)

Figure 1:
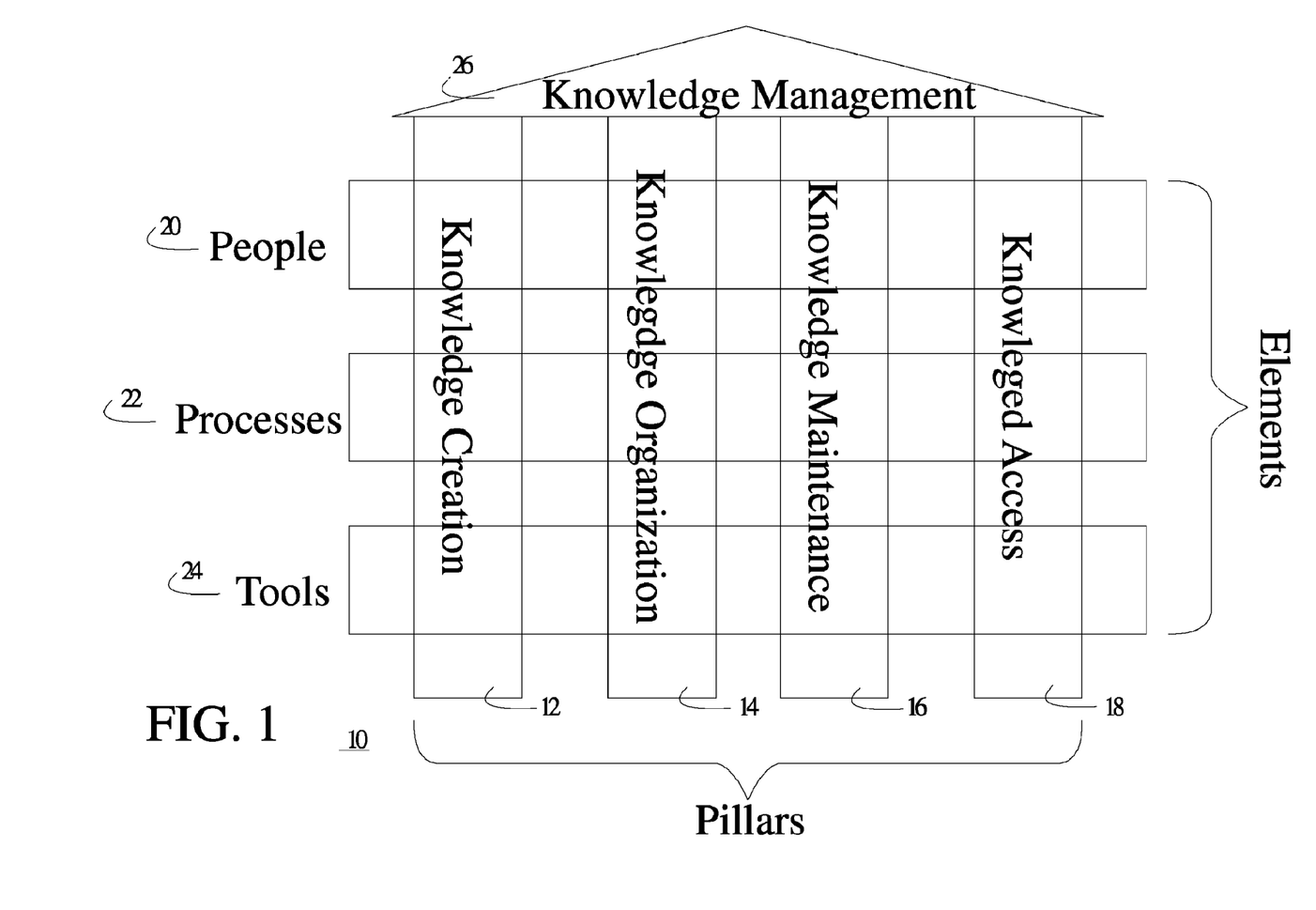
FIG. 1 is a block diagram illustrating an overview 10 of a non-limiting embodiment of a knowledge management framework in accordance with the present invention.

FIG. 1 is a block diagram illustrating an overview 10 of a non-limiting embodiment of a knowledge management framework in accordance with the present invention. Knowledge management framework 26 may include one or more pillars 12-18, each pillar having one or more elements 20-24. The pillars may represent one or more functions of a knowledge management program. In this example, the pillars include knowledge creation 12, knowledge organization 14, knowledge maintenance 16 and knowledge access 18. Different or additional pillars may be incorporated. In this embodiment, the pillars include three elements: people 20, process 22 and tools 24. The elements may represent one or more common knowledge management aspects that are addressed under each of the pillars. Different or additional elements may be incorporated.

In one embodiment of the present invention, knowledge creation pillar 12 may include two steps. The first step may include defining knowledge and identifying a list of knowledge artefacts. The second step may include creating the knowledge artefacts identified in the first step. Regarding the first step, the definition of knowledge may be very subjective because knowledge can mean different things to different people. Accordingly, to complete step one, one may first arrive at a common understanding of what knowledge means in the context of support for the particular software application at issue. Once this common understanding is established, a list of knowledge artefacts can be identified to capture and hold the knowledge within this understanding.

The process element 22 of the knowledge creation pillar 12 may include a plurality of tasks including but not limited to:
 establishing a scope for a knowledge creation activity;
 defining a logical set of activities to enable knowledge capture;
 defining inputs to each stage of knowledge capture activities; and
 defining outputs and/or deliverables for logical groups of knowledge creation activity.

The people element 20 of the knowledge creation pillar 12 may include identifying an audience and requirements for creating knowledge artefacts. Preferably, knowledge creation activities are performed by specifically identified practitioners.

The tools element 24 of the knowledge creation pillar 12 may include tools and templates which aid the process of knowledge creation.

Knowledge organization 14 may involve organization of the created knowledge artefacts to facilitate their accessibility and maintenance. The process element 22 of knowledge organization 14 is concerned with the storing and retrieval of knowledge artefacts. Preferably, the structure is flexible and can easily adapt to future structure adjustments. The people element 20 of knowledge organization 14 is concerned with the audience and practitioners. The tools element 24 of the knowledge organization 14 includes automated tools that provide for structure customization features that enable artefact storage and retrieval.

The knowledge maintenance pillar 16 of the knowledge management framework 26 involves maintenance of knowledge artefacts generated through the knowledge creation process. The process element 22 of the knowledge maintenance pillar 16 may include identifying one or more triggers from updating knowledge artefacts, defining a process for maintaining a revision history of a knowledge artefact, and defining a mechanism for reviewing the updates to knowledge artefacts. The people element 20 of the knowledge maintenance pillar 16 may include identifying the people who are authorized to update knowledge artefacts, and identifying the people who can review the updates to the knowledge artefacts and approve or reject changes to artefacts. The tools element 24 of the knowledge maintenance pillar 16 may include defining one or more check lists for the knowledge artefact update process and defining check lists for the knowledge artefact review process.

The knowledge access pillar 18 of the knowledge maintenance framework 26 may generally include specifying one or more guidelines that govern access privileges to the knowledge artefacts. The process element 22 of the knowledge access pillar 18 may include defining one or more guidelines for providing/restricting access requirements to the knowledge artefacts, defining the roles of the different participants of a knowledge management program, and defining a governance model for the knowledge management program. The people element 20 of the knowledge access pillar 18 may include identifying the audience and the practitioners for the knowledge artefacts. The tools element 24 of the knowledge access pillar 18 may include identifying one or more tools that support implementation of access related policies.

Figure 2:
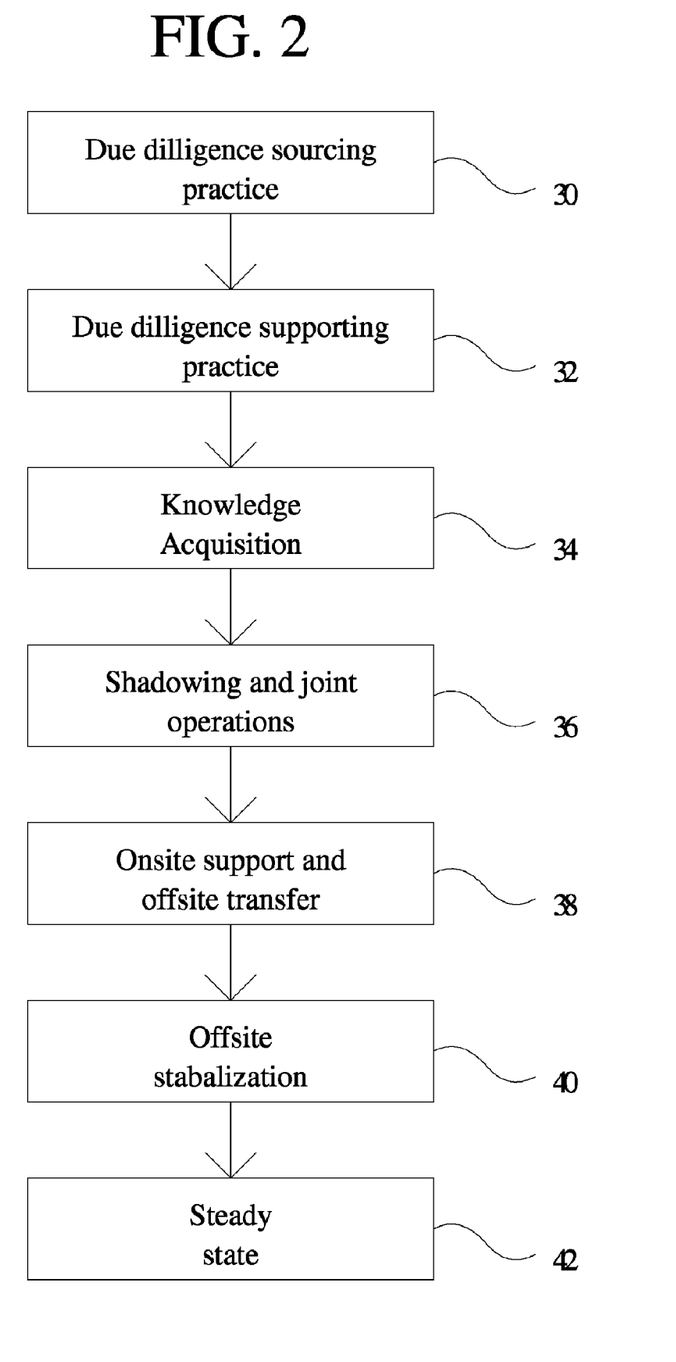
FIG. 2 is a non-limiting example of a knowledge transition process in accordance with one embodiment of the present invention.

FIG. 2 is a non-limiting example of a knowledge transition process in accordance with one embodiment of the present invention. Aspects of the process illustrated in FIG. 2 may be modified, rearranged or supplemented to best fit a particular implementation of the present invention.

Figure 3:
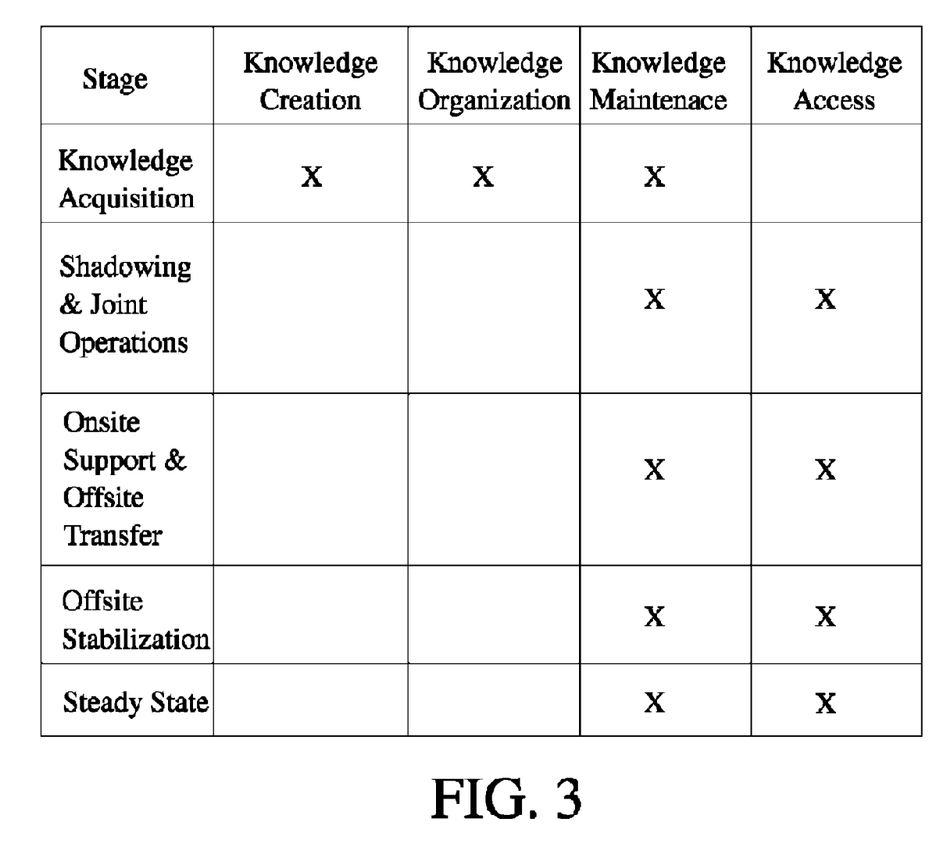
FIG. 3 illustrates an example mapping of aspects of the knowledge transfer process illustrated in FIG. 2 to the knowledge management framework illustrated in FIG. 1.

In a non-limiting example for transitioning production support of a computer application for an enterprise, the process may include seven stages. A due diligence sourcing practice stage 30 may begin when the production support of an application is identified as a possible candidate for transition. Preferably, each stage is verified with a gate review. At the final stage, a full replacement of the existing production support resources may be replaced with resources of the supporting practice spread globally as applicable. The chart illustrated in FIG. 3 illustrates an example mapping of aspects of the knowledge transfer process illustrated in FIG. 2 to the knowledge management framework illustrated in FIG. 1.

The sourcing practice due diligence step 30 is to identify software applications for transition and to ensure that explicit knowledge is available. This step can also include ensuring that all required application documents are provided.

Discussion can be had to develop agreement on potential applications for transition. These can be based on local practices. A questionnaire can also be completed and resource requirements may be detailed.

The completeness of the documentation may be verified and needs for supplementary documentation may be identified. Supplementary documentation may include, but is not limited to, a project charter, service level agreements, etc. A business case for transition may also be developed.

A request for quote can be completed, and a gate review checklist may be completed as well.

Completion of this step may result in, among other things, a vitals document, a list of resource requirements, a job description, a set of knowledge artefacts, and a request for quote.

Additional possible tasks at this step may include, but are not limited to: setting up a team connect site for an application; updating the location details of mandatory documents, or uploading them to the team connect site; preparing assessment modules for some or all documents; and preparing or identifying sample tickets for training a team.

The due diligence supporting practice step 32 includes reviewing the scope of the application and holding sessions with the sourcing practice for clarification. This stage may be triggered by completion of the previous stage. Among other things, this stage may include a review of due diligence documentation and vendor selection.

This stage may also include coordination of communication between vendors and local practices, as well as a review of scope, application environment, and documentation.

This stage may further include provision of clarification and further information to vendors where requested, as well as providing a proposal and financial schedules.

This stage may also include review of proposal, approval of proposals and financial schedules, and selection of vendor resources. A project plan may also be developed, and infrastructure may be reviewed.

Finally, a checklist may be completed and a detailed knowledge transfer plan may be developed.

In at least one illustrative embodiment, this stage results in creation of a proposal and financial information, a project plan, which may include a detailed knowledge transfer plan and training plan, and an approved proposal and financial schedule.

The knowledge acquisition step 34 includes providing support practice resources with tacit and explicit knowledge of the application and collecting knowledge transfer documentation. Preferably, this step is verified by the sourcing practice (e.g. tacit knowledge is converted to explicit knowledge for externalization).

This portion of the illustrative process may include continuing to provide application support while supporting resources in knowledge acquisition. Resource may also be on boarded during this portion. Evaluation criteria for a team undergoing a transition may also be defined here, and knowledge areas may be covered as detailed in the knowledge transfer plan.

This illustrative implementation may also include preparation of knowledge transfer documents to support the transfer of knowledge. The step may also include creation of knowledge management artefacts and review of knowledge transfer documentation.

This illustrative step may further include starting of environment setup, and completion of reverse presentation of knowledge transfer to a local practice.

Further, this step may include carrying out a knowledge transfer to an offsite team, second time reverse presentation of knowledge transfer to a local practice, and completion of a checklist.

Updated knowledge management artefacts may result from this process.

The shadowing and joint operations step 36 includes having the supporting practice resources shadow the existing team and jointly conduct operations in readiness to support the application. This step enables socialization and externalization of the knowledge artefacts.

This step may include continuing to provide application support while supporting shadowing actions. It may further include verifying an environment set up and sharing and agreeing on metrics to be tracked for evaluation.

This step may also include observation of current staff and carrying out of joint operations. Also, work tickets may be assigned for completion in accordance with a project plan.

This step may further include evaluating readiness to move to offsite stabilization based, for example, on metrics. And completion of a checklist is also possible at this step.

Output from this step may exclude, but is not limited to, agreement that the resources have the functional, technical and procedural knowledge to support the application; updated knowledge artefacts; knowledge transfer metrics; and an updated team performance scorecard.

The on-site support and off-site transfer step 38 may apply if supporting practice resources go to the sourcing practice location for knowledge acquisition. Supporting practice resources may return to their country of origin and continue to provide production support. Preferably, primary production support responsibility switches to the supporting practice team during this phase.

This illustrative embodiment may include return of offsite resources and verification that an environment is ready for those resources, as well as preparation of an offshore team to take over production support.

This step may further include sharing and agreement of metrics to be tracked for evaluation, coordination of onsite and offsite staff, and provision of primary support by an onsite team.

This step may also include switching of responsibility for production support activities, provision of support to an offshore production support team, and placement of a service level agreement. Metrics for evaluation in a steady state may also be established.

This step may further include measurement of knowledge transfer metrics, and updating of knowledge management artefacts as required. Updating team performance scorecards may also be performed, as well as evaluating the readiness to move to offshore stabilization based on, for example, metrics. A checklist may also be completed.

Outputs from this step may include, but are not limited to, an agreement that resources have taken on production support responsibility; updated knowledge artefacts; knowledge transfer metrics; and an updated team performance scorecard.

The off-site stabilization step 40 refers to the time to allow stabilization of production support by the supporting practice resources prior to the steady state step described below.

This illustrative step may include completion of all transition activities and coordination of onsite and offsite staff.

This step may also include implementation of processes to support escalation of emergencies and review of the support metrics. This step may further include discussion of artefact maintenance and review frequency.

Further, this step may include updates to knowledge management artefacts as required and an update to a team performance scorecard.

This step may also include preparation for administrative knowledge transfer, using, for example, a self-readiness checklist. This checklist may be filled in with available information collected from artefacts. Gaps may be documented, along with an action plan to complete before steady state review.

A team connect site may also be updated with an administration checklist, and a review checklist may be completed and verified.

Outputs from this step include, but are not limited to: transfer of production support responsibility; updated knowledge artefacts; support metrics; an updated team performance scorecard; and an action plan for gaps.

The steady state step 42 ensures that the transition to the supporting practice has been successfully completed. Continuous support of the application is maintained.

This illustrative step may include regular metric assessment and a customer satisfaction survey to be completed by, for example, sample application users.

This illustrative step may further include provision of full production support and performance of supervisory responsibilities.

This illustrative step may include putting processes in place to support escalation of issues and processes being put in place to continue to capture and report metrics.

This step may further include a wrap up review, updates to knowledge artefacts as required, verification of cost savings, and completion of a review checklist.

Planning and execution of cross training may also be included in this step. A secondary knowledge transfer in cases of attrition may also be performed. Knowledge transfers for enhancements may further be performed.

Outputs from this step may include, but are not limited to, application metrics and updated knowledge artefacts.

In one embodiment of the present invention, shadowing, coupled with an efficient use of resources in steady state for a period of time (e.g. three months or so) may increase productivity. This may avoid having to keep a resource in training phase for longer periods of time.

Figure 4:
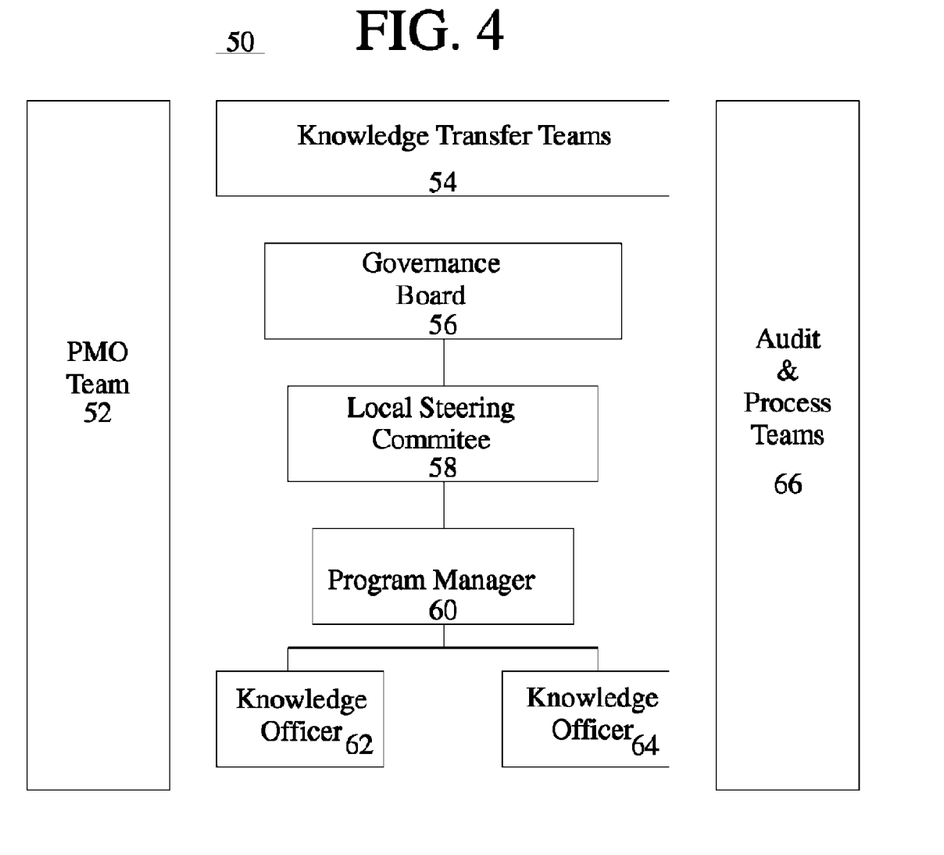
FIG. 4 illustrates an example governance structure for administering the knowledge management framework illustrated in FIG. 1.

FIG. 4 illustrates an example governance structure for administering the knowledge management framework illustrated in FIG. 1. The governance structure includes a program management office (PMO) team 52, knowledge transfer teams 54 and audit and process team 66. Preferably, a governance board 56 is established which includes a local steering committee 58, one of more program managers 60 having one or more knowledge officers 62 and 64.

A program management office may ensure consistent knowledge capture, transfer and storage of processes across all application bundles, vendors, and practice in such a way that the process of knowledge transfer can be managed and monitored in an objective and quantitative manner. In this fashion, management can ensure process compliance, improve the knowledge management process, pro-actively identify and mitigate risks, scale the process from application to application, and better manage change.

Preferably, ongoing operations reviews ensure that the health of the operation is maintained and necessary steps are taken to ensure knowledge is developed, maintained and shared effectively within the various teams.

Preferably, knowledge management best practices are implemented in the knowledge transfer process. A scoring mechanism may be implemented to gauge the effectiveness of knowledge transfer across a variety of knowledge groups including but not limited to functional knowledge transfer, technical knowledge transfer, systems knowledge transfer and process knowledge transfer. The scoring mechanism may be implemented to generate an individual performance scorecard and/or a team performance scorecard. A toll gate review may be implemented at one or more, preferably all, stages of the knowledge transfer process to ensure effective monitor. Effective usage of tools like CAMTESIA and MICROSOFT SHAREPOINT portal may ensure that knowledge transfer is effectively codified and that the target audience is reached. A weekly scorecard review may take place with senior management. In one embodiment, a portfolio manager from the PMO may be paired with a supporting practice manager to collectively be responsible for more than one application. The applications may be aligned to business functions such as marketing and sales, human resources, finance, service, etc.

The scoring mechanism may include rating knowledge receivers on a scale from 1 to 5. Each knowledge area to be scored may be assigned a weight based on its significance for application support. For example, Table 1 below correlates a weight to a plurality of different knowledge areas. Notably, weights of all the knowledge areas must add to 1.

TABLE 1

| Weight | Knowledge Area |
|--------|----------------|
| .5     | Technical Understanding |
| .25    | Application Domain and Functional Knowledge |
| .25    | Customer Interaction |

Resources receiving knowledge for an application may be assigned a weight, depending on their share of knowledge needed for application support. For example, if two resources are being trained and one is being trained for 80% of the application and the other resource is being trained for 20% of the application, the first resource should get a weight of 0.8 and the second resource should get a weight of 0.2. Weights assigned to all of the resources for an application must add to 1.0.

For each assessment, a cut-off or passing score may be decided. A team score for an application may be calculated by adding weighted scores of individual resources receiving an application knowledge transfer. Preferably, the scores are compiled and published by the knowledge management organization.

Figure 5:
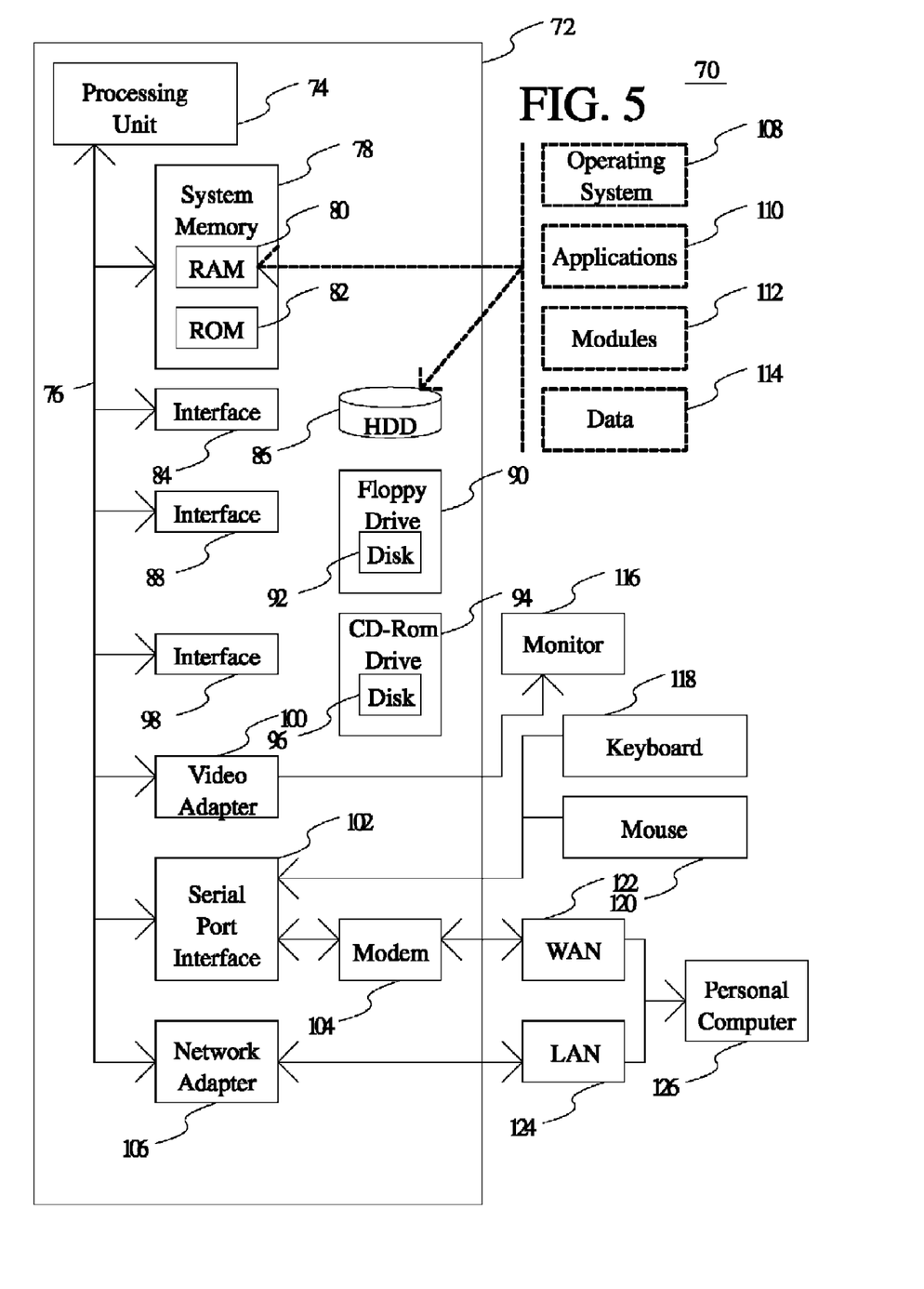
FIG. 5 illustrates a suitable computing environment for implementing an embodiment of the present invention.

FIG. 5 is a block topology diagram illustrating an example of computing environments for implementing embodiments of the present invention. According to one embodiment, the system comprises a stand-alone personal computing environment. According to another embodiment, the system comprises a networked computer environment having a typical server-client configuration. Notably, a plurality of computing environments are understood by those skilled in the art of computing architecture and may be configured for implementing the present invention.

The computer system 70 comprises a server or personal computer 72 including a processing unit 74, a system memory 78 and a system bus 76 that interconnects various system components including the system memory 78 to the processing unit 74. The system bus 76 may comprise any of several types of bus structures including a memory bus or memory controller, a peripheral bus, and a local bus using a bus architecture such as PCI, VESA, Microchannel (MCA), ISA and EISA, to name a few. The system memory includes read only memory (ROM) 82 and random access memory (RAM) 80. A basic input/output system (BIOS), containing the basic routines that help to transfer information between elements within the computer 72, such as during start-up, is stored in ROM 82. The computer 72 further includes a hard disk drive 86, a magnetic disk drive (floppy drive, 90) to read from or write to a removable disk 92, and an optical disk drive (CD-ROM Drive, 96) for reading a CD-ROM disk 94 or to read from or write to other optical media. The hard disk drive 86, magnetic disk drive 90, and optical disk drive 96 are connected to the system bus 76 by a hard disk drive interface 84, a magnetic disk drive interface 88 and an optical drive interface 98, respectively. The drives and their associated computer-readable media provide nonvolatile storage of data, data structures, computer-executable instructions (program code such as dynamic link libraries, and executable files), etc. for the computer 72. Although the description of computer-readable media above refers to a hard disk, a removable magnetic disk and a CD, it can also include other types of media that are readable by a computer, such as magnetic cassettes, flash memory cards, digital video disks, Bernoulli cartridges, and the like.

A number of program modules may be stored in the drives and RAM 80, including an operating system 108, one or more application programs 110, other program modules 112, and program data 114. A user may enter commands and information into the computer 72 through a keyboard 118 and pointing device, such as a mouse 120. Other input devices (not shown) may include a microphone, dictaphone, scanner, or the like. These and other input devices are often connected to the processing unit 74 through a serial port interface 102 that is coupled to the system bus, but may be connected by other interfaces, such as a parallel port, game port or a universal serial bus (USB). A monitor 116 or other type of display device is also connected to the system bus 76 via an interface, such as a video adapter 100. In addition to the monitor, the computer may include other peripheral output devices (not shown), such as speakers and a printer.

In a networked configuration, there are several client computers 126 having a similar architecture to computer 72 and configured to operate as a client to computer 72 configured to operate as a server. The logical connections depicted in FIG. 5 between server computer 72 and any client computer 126 include (but are not limited to) a local area network (LAN) 124 and a wide area network (WAN) 122. Such networking environments are commonplace in offices, enterprise-wide computer networks, intranets and the Internet.

When used in a LAN networking environment, the server computer 72 is connected to the local network 124 through a network interface or adapter 106. When used in a WAN networking environment, the server computer 72 typically includes a modem 104 or other means for establishing communications over the wide area network 122, such as the Internet. The modem 104, which may be internal or external, is connected to the system bus 76 via the serial port interface 102. In a networked environment, program modules depicted relative to the server computer 72, or portions of them, may be stored in a remote memory storage device (not shown).

Figure 6:
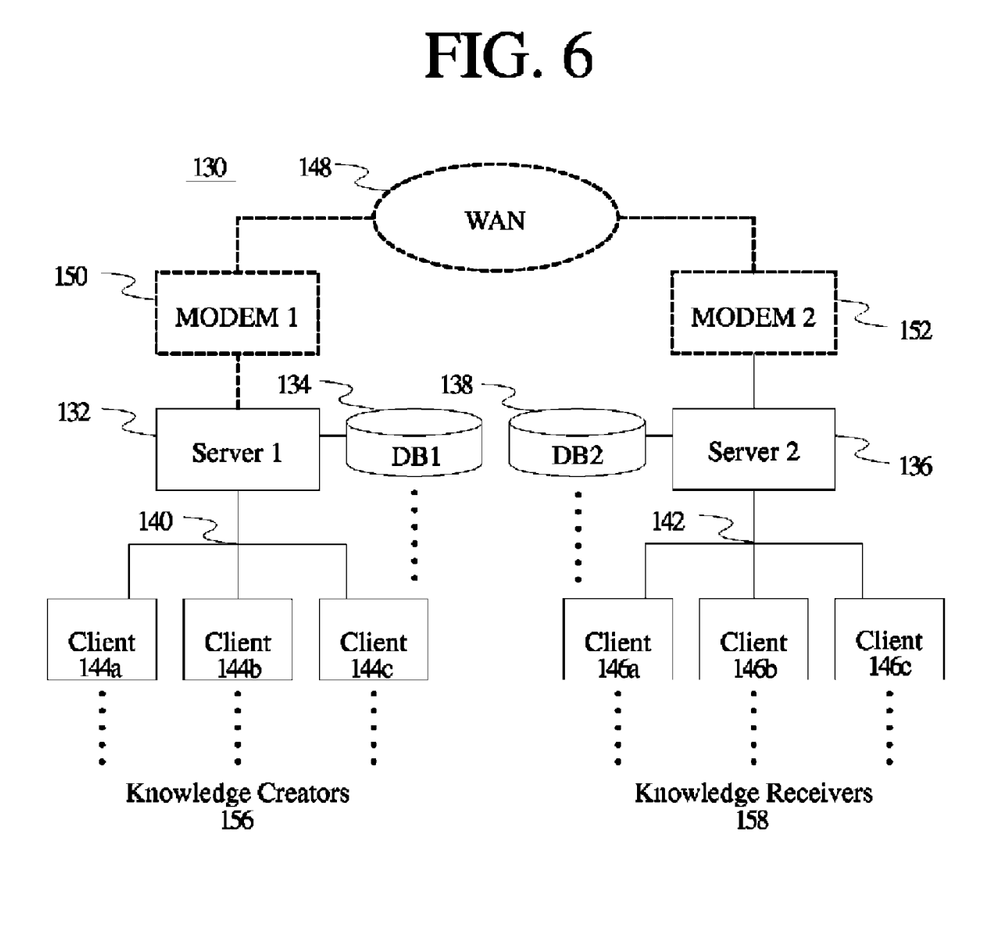
FIG. 6 illustrates an example networking topology 130 in accordance with one non-limiting embodiment of the present invention.

FIG. 6 illustrates an example networking topology 130 in accordance with one non-limiting embodiment of the present invention. In this example, knowledge creators at location 156 access client computers 144a-144c to communicate over local area network 140 with server 132. Server 132 is in bi-directional communication with one or more databases 134 at which knowledge artefacts may be stored. Server 132 may communicate with server 136 via a wide area network 148 (e.g. Internet). Alternatively, server 132 and server 136 may communicate via analog communication implementing modem 150 and modem 152, respectively, to convert digital information to analog signals for communication over long distances. In one implementation of the present invention, knowledge creators 156 may be located in one country, while knowledge receivers 158 may be located in another country. Knowledge receivers 158 may access knowledge artefacts stored within database 134 at the knowledge creators' location 156 via wide area network 148. That information may additionally be copied or transferred to database 138.

Servers 132 and 136 may be operatively programmed to automatically score individual and team performances described above. For example, database 134 and/or 138 may store predefined weight criteria such as that illustrated in Table 1 and otherwise described above. Users of client computers 144a-144c and/or 146a-146c may be prompted for a rating of knowledge receivers on a scale from 1 to 5. These ratings may be automatically applied to the predefined weight criteria described above, to calculate a final score. An automatic determination may be made based on additional predefined criteria as to whether these scores pass or fail. Passing and/or failing scores may be published by server 132 and/or server 136 for access by client computers 144a-144c and/or 146a-146c for access by any of the entities referenced in the governance structure of FIG. 4.

Triggering events and/or gate reviews for one or more of the process steps may be programmatically implemented with the systems illustrated and described with respect to FIGS. 5 and 6. A knowledge transfer management computer application may be implemented which receives input from the knowledge transferor(s) or the knowledge transferee(s) establishing that described milestones have been met for each process step. The input may be a user acknowledgment of a predefined or user-specified task completed, or an acknowledgment that must additionally be confirmed by one or more other process participants, such as a team manager. In an alternative embodiment, substantive task documentation, or completed templates, are uploaded, and computer 72 and/or server 132 and 136 may automatically confirm that minimum documentation standards have been met for satisfying a gate review or triggering an event. For example, the computer(s) may evaluate templates to confirm that all required fields have received data, or that the received data itself is of sufficient breadth or size.

Upon automated execution of the triggering event, or upon successful completion of a gate review, the computer(s) may automatically notify one or more process participants. Notification may be made by e-mail, text-messaging or the like. In one embodiment of the present invention, only select process participants are notified. For example, only participants relevant to a particular process step or task may be notified. Relevant persons may include the people that participated in the completion of the milestone. Relevant persons may also include the people that are responsible for the following milestone, because they must begin the process of completing their tasks according to the described process.

Because triggering events and/or gate reviews may be implemented programatically to automatically confirm that tasks and milestones associated with the described process are met, a centralized computing environment may be implemented to manage and report the status of the knowledge transfer associated with a software application for an enterprise. Centralized participant scoring may also be implemented as described above. The centralized computing system may receive input identifying (i) the applications for which support knowledge is to be transferred, (ii) the knowledge artefacts, (iii) the supporting documentation, (iv) the identity and contact information (for automatic notifications) of the transferors and transferees participating in the process, (v) the organizational architecture of the governance structure, and (vi) the status of the knowledge transfer status, i.e. at which stage of the described process is the project at.

Figure 7:
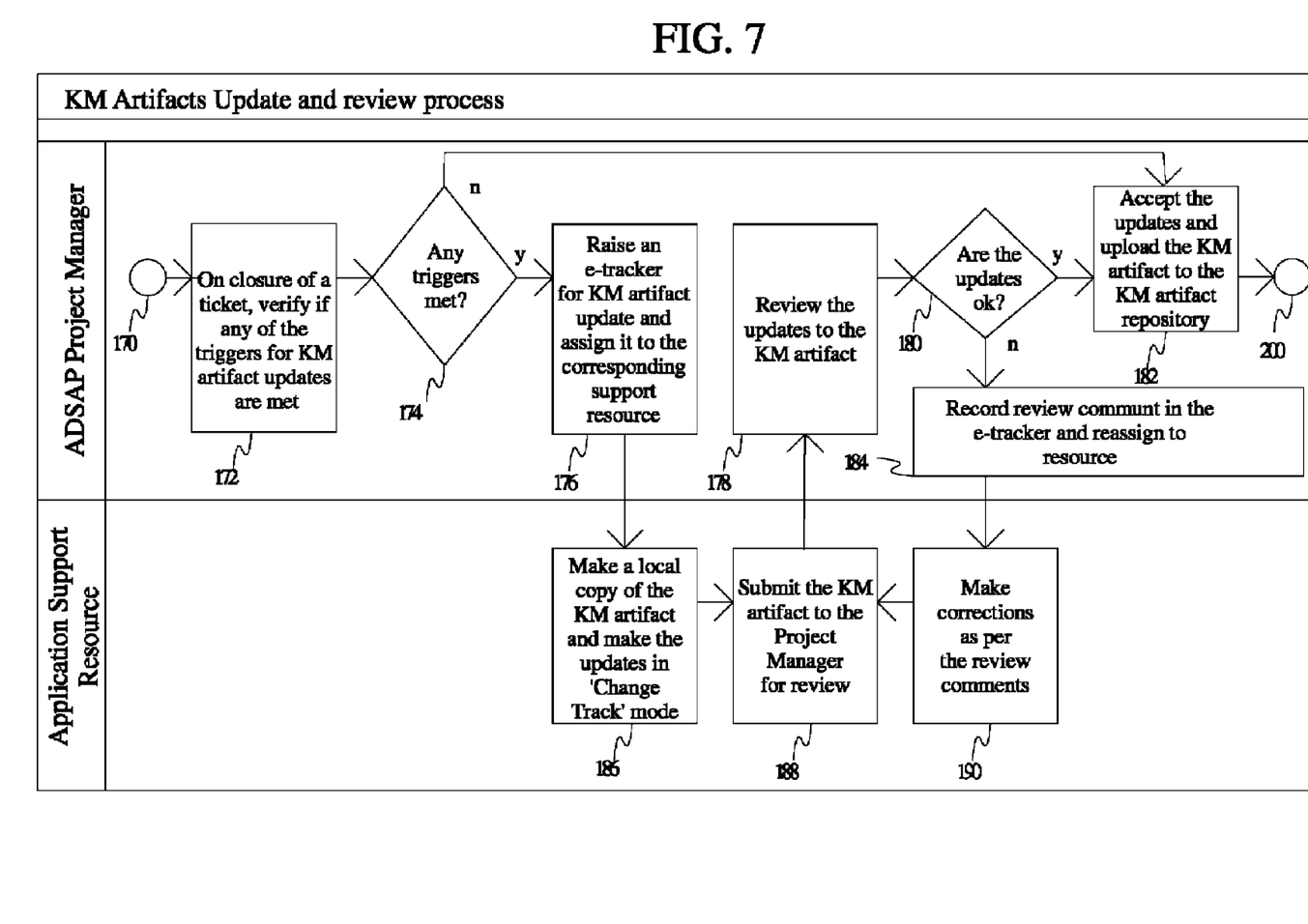
FIG. 7 is an example block flow diagram illustrating an update in review process for knowledge artefacts.

Preferably, aspects of the present invention are implemented together with a process for maintaining knowledge artefacts. FIG. 7 is an example block flow diagram illustrating an update in review process for knowledge artefacts. The process begins at 170. On closure of a ticket, a project manager verifies if any of the triggers for knowledge artefact updates are met, as represented in block 172. If any triggers are met as represented in decision block 172, an e-tracker for the knowledge artefact update is raised, and assigned to a corresponding support resource as represented in block 176. If there is no trigger met, the process ends at 200, and awaits closure of another ticket as represented in block 172. If any tracker is raised as represented in block 176, a local copy of the knowledge artefact is made as represented in block 186 with updates made in a "change track" mode. Next, as represented in block 188, the knowledge artefact is submitted to the project manager for review. The project manager reviews the knowledge artefact as represented in block 178. If the updates are okay as represented in decision block 180, the project manager accepts the updates and uploads the knowledge artefact to the knowledge artefact repository as represented in block 182. If the updates are not okay, the project manager inputs comments into the e-tracker and reassigns the update to a resource, as represented in block 184. The resource makes corrections as per the review comments as represented in block 190, and resubmits the knowledge artefact to the project manager for review as represented in block 188.

While the best mode for carrying out the invention has been described herein, those familiar with the art to which this invention relates will recognize various alternative designs and embodiments for practicing the invention as defined by the following claims.

What is claimed:

1. A computer network system for implementing a knowledge transfer process, comprising:
one or more local computers, accessible by knowledge creators, the computers including at least local processors and persistent memory, the local processors operable to access a knowledge database stored in the persistent memory of at least one local computer;
one or more remote computers, accessible by knowledge receivers, the computers including at least remote processors and persistent memory, the remote processors operable to access the knowledge database stored in the persistent memory of at least one local computer;
wherein processors in at least one local and/or remote computer are operable to automatically score individual and/or team performance;
wherein the processors in at least one local and/or remote computer are operable to detect triggering events establishing that a predetermined milestone has been met;
wherein the processors in at least one local and/or remote computer are further operable to determine that a knowledge transfer process should continue to a next phase based at least on scoring of performances and completion of one or more predetermined milestones;
wherein, upon determining that the knowledge transfer process should continue to the next phase, the processors in at least on local and/or remote computer automatically notify one or more process participants that the process should continue to the next phase.

2. The system of claim 1, wherein the knowledge database is further stored in the persistent memory of at least one remote computer.

3. The system of claim 1, wherein users of one or more local and/or remote computers input a rating of knowledge receivers and wherein the processors of one or more local and/or remote computers are operable, using the input rating, to automatically apply a predefined weight criteria and calculate an evaluation score to be output.

4. The system of claim 3, wherein the processors of one or more local and/or remote computers are further operable to automatically determine whether an evaluation score is a passing or failing score.

5. The system of claim 1, wherein the processor of at least one local and/or remote computers are operable to determine whether or not uploaded documents meet predefined minimum documentation standards, and wherein the determination that a knowledge transfer process should continue to the next phase is further based on a determination that minimum standards have been met.

6. The system of claim 1, wherein the next phase is a due diligence supporting phase, being continued to from a due diligence sourcing phase.

7. The system of claim 1, wherein the next phase is a knowledge acquisition phase, being continued to from a due diligence supporting phase.

8. The system of claim 1, wherein the next phase is a shadowing and joint operations phase, being continued to from a knowledge acquisition phase.

9. The system of claim 1, wherein the next phase is an offsite support and offsite transfer phase, being continued to from a shadowing and joint operations phase.

10. The system of claim 1, wherein the next phase is an offsite stabilization phase, being continued to from an offsite support and offsite transfer phase.

11. The system of claim 1, wherein the next phase is a steady state phase, being continued to from an offsite support and offsite transfer phase.

12. A method for review of knowledge artefacts comprising:
 verifying if one or more predetermined triggers for knowledge artefact updating has been met;
 raising an e-tracker for at least one knowledge artefact update identified by the verifying;
 assigning the e-tracker to support resources;
 saving an unaltered copy of a knowledge artefact to be updated; and
 updating either the copy or the original knowledge artefact in a change tracking mode.

13. The method of claim 12, further comprising:
 submitting the knowledge artefact to a project manager for review.

14. The method of claim 13, further including uploading the knowledge artefact to a knowledge artefact repository based on the acceptability of the updates.

15. The method of claim 13, wherein further including inputting comments and reassigning the update task to a resource, based on the acceptability of the updates.

16. An information technology knowledge transfer method for transferring primary application support from a first support organization to a second support organization in a knowledge management framework, the process comprising:
 (i) identifying one or more computer applications for transition from a first support organization having primary support responsibilities to a second support organization;
 (ii) identifying a plurality of knowledge artefacts associated with the identified computer application(s);
 (iii) the second support organization receiving the plurality of knowledge artefacts;
 (iv) one or more members of the first organization shadowing one or more members of the second support organization during support of the identified computer application(s); and
 (v) transferring primary computer application support for the identified application(s) from the first support organization to the second support organization.

17. The method of claim 16 wherein one or more of steps (i) through (ii) includes a predefined triggering event upon which the step is executed.

18. The method of claim 16 where a gate review is performed at or near the completion of one or more of steps (i) through (ii).

19. The method of claim 16 additionally comprising scoring one or more knowledge receivers of the second support organization.

20. The method of claim 16 additionally comprising transitioning to a period of steady state application support by the second support organization.

* * * * *